July 13, 1965  J. F. HERNDON  3,194,400
CENTRIFUGAL SOLVENT EXTRACTION
Filed Dec. 21, 1960  7 Sheets-Sheet 1

INVENTOR
John F. Herndon
BY
ATTORNEYS

July 13, 1965    J. F. HERNDON    3,194,400

CENTRIFUGAL SOLVENT EXTRACTION

Filed Dec. 21, 1960    7 Sheets-Sheet 2

INVENTOR
John F. Herndon
BY
ATTORNEYS

July 13, 1965  J. F. HERNDON  3,194,400
CENTRIFUGAL SOLVENT EXTRACTION
Filed Dec. 21, 1960  7 Sheets-Sheet 4

INVENTOR
John F. Herndon
BY
ATTORNEYS

Fig. 20.

INVENTOR
John F. Herndon
BY
ATTORNEYS

INVENTOR
John F. Herndon
BY
ATTORNEYS

United States Patent Office 3,194,400
Patented July 13, 1965

3,194,400
CENTRIFUGAL SOLVENT EXTRACTION
John F. Herndon, Park Chester Hills, West Chester, Pa., assignor to Malvern Institute for Psychiatric and Alcoholic Studies, Malvern, Pa., a non-profit corporation of Pennsylvania
Filed Dec. 21, 1960, Ser. No. 77,422
11 Claims. (Cl. 210—203)

The present invention relates to chromatographic separation devices of the character which employ a separating medium such as paper, starch, ion exchange medium, or the like, with application of centrifugal force, and with introduction of a development liquid which by difference in solubility causes separation of a material to be separated.

A purpose of the invention is to reduce the time required for chromatographic separation for the purpose of analysis, and industrial separation.

A further purpose is to permit chromatographic separations selectively at high speed, low speed or under static conditions using the same mechanism.

A further purpose is to permit chromatographic separation in the same mechanism by using a plurality of different separating media, a plurality of different development liquids, or both.

A further purpose is to produce a more even solvent front and a more clearly defined component band so that different components can be more accurately scanned for area determination.

A further purpose is to secure better control of delivery of development liquid in centrifugal chromatography.

A further purpose is to reduce lateral diffusion of development liquid during its outward flow. It is particularly desirable to reduce this feature which is characteristic of disc centrifugal chromatography.

A further purpose is to apply centrifugal chromatography to industrial solvent extraction.

A further purpose is to mount on a rotating shaft or the like a generally outwardly or radially extending channel having sides or defining generally radially extending walls and to position in said channel and between said walls a separating medium such as paper, starch, ion exchange resin or the like.

A further purpose is to provide relatively converging side walls of the channel to hold the separating medium in place.

A further purpose is to provide a recess at one side of the channel or passage, suitably with supporting projections for the separating medium, so as to prevent the formation of puddles in case excess of solvent is fed.

A further purpose is to provide a plurality of radial channels around a rotor, and to distribute development liquid separately to each of the channels, permissibly through a separate passage or through a separate wicklike feeder for each channel.

A further purpose is to prevent dripping of condensed development liquid on the surface of the separation medium, preferably by providing a cover which will carry any condensed droplets radially outwardly.

A further purpose is to introduce the separating medium for a plurality of radial channels as a unit, suitably in the form of a spoked wheel having a hub and a rim, the spoke elements fitting into the respective channels.

A further purpose is to introduce the separation medium in the form of a disc having radially extending ribs which enter the channels and convey the development liquid.

A further purpose is to provide one or more separate channels on a rotor, each of which has a strip of radially extending parallel sided separating medium such as paper, starch, ion exchange resin or the like, and to supply development liquid which may permissibly also contain material to be separated to the channels independently, thus permitting the use of different separating media, and/or development liquids and/or different materials to be separated in the respective channels.

A further purpose is to provide catch means at the radial outer ends of the channels which are individual to the different channels.

A further purpose is to surround a channel or channels of a rotor with a catch ring and to substitute other catch rings successively as in a sequence in order to take off different fractions.

A further purpose is to provide different channels at different axial positions along the rotor and different catch rings for the different channels located at the different axial positions.

A further purpose is to permit utilization of centrifugal chromatography in more precise control of product composition and quality.

A further purpose is to adapt ion exchange methods of centrifugal chromatography to broad ranges of commercial separation and purification, including the purification of brackish water, sea water, brine, and polluted water.

A further purpose is to change the center of centrifugal rotation.

A further purpose is to pre-wet the fiber disc wicks with development liquid before starting the separation.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

FIGURES 1 to 6 inclusive show a preferred embodiment of the device of the invention for noncontinuous operation.

In the prior art, centrifugal chromatography has been used as a means of analytical separation of components due to difference in solubility. In usual practice, a disc of filter paper or the like, preferably of the type having random fiber direction, has usually been rotated on a vertical axis, the filter paper during rotation being substantially free from support or supported by plates or by fingers or supported by an outside rim and an inside hub. The samples have usually been spotted on to the paper at various points around the circumference adjacent to the axis. The liquid used to develop the sample, suitably a solvent or a buffer, has been introduced by injecting at the center or by spraying at the hub. While these techniques have offered promise, the control has been so difficult that results other than qualitative results have been very difficult and inconsistent.

Among the difficulties encountered have been the following:

(1) One difficulty has been that the paper tends to break or tear near the hub and destroy the further experiment.

(2) Separations of distinct components like different amino acids have often not been precise, but the areas have overlapped and comet-tailed so that the lines of separation have been ill-defined or indefinable.

(3) In many cases the tendency has been to spread laterally into ill-defined configurations which do not lend themselves readily to separation, identification and quantitative estimation.

(4) Just as the areas of separation of components have been uneven, the solvent front has tended to be uneven and is practically always elliptical or scalloped, making it difficult to determine the exact solvent front diameter which is a critical feature in determining the positions which different components should assume ($R_f$).

(5) The devices of the prior art have not been adaptable to operation with a plurality of different separating media or a plurality of different development liquids in a single separation, which may operate on different materials to be separated.

(6) It has also not been practical in prior art devices to use the same mechanism for both stationary chromatography and also centrifugal chromatography.

(7) The devices of the prior art have not made it possible to produce large quantity industrial centrifugal chromatographic separations.

The present invention makes it possible to greatly reduce the time required, because the chromatographic separation is much better controlled, the separation areas are more precisely defined and in fact are generally bands, which can be conveniently estimated qualitatively and quantitatively.

The invention also makes it possible to control much more precisely the shape of the solvent front, which is important in chromatographic separations.

The invention also reduces the difficulties through lateral spreading of separation areas.

Comet-tailing is no longer a problem.

It is possible, in accordance with the present invention, to operate with a plurality of different separating media, and/or a plurality of different solvents, in the same mechanism.

The invention also lends itself to fractional separations.

The device of the invention is particularly adaptable for large scale industrial centrifugal chromatographic separations.

The invention also much more precisely controls the feed of solvent so that difficulty through excessive solvent feed or thorough uneven solvent feed is eliminated.

Chromatographic separations can be carried out with differences in center of rotation.

In the device of the invention difficulties through the direction of the paper fiber are less serious than in the prior art.

Considering now the drawings in detail, in FIGURES 1 to 6 I illustrate a disc 20 which is mounted on a shaft 21 turning at a suitable variably controlled speed on a vertical axis, preferably by a motor combined with a speed reducer, which shaft mounts an adapter 23 secured to the disc 20. The adapter has a hub portion which surrounds the shaft and is anchored thereon by set screw 24, and above the hub has a flange 25 which rests on the bottom of disc 20 suitably in a recess. Above flange 25 there is a stub shaft extension 26 which is of key formation, suitably flattened, and conforms to the shape of opening 27 at the center of disc 20.

Figure 1:
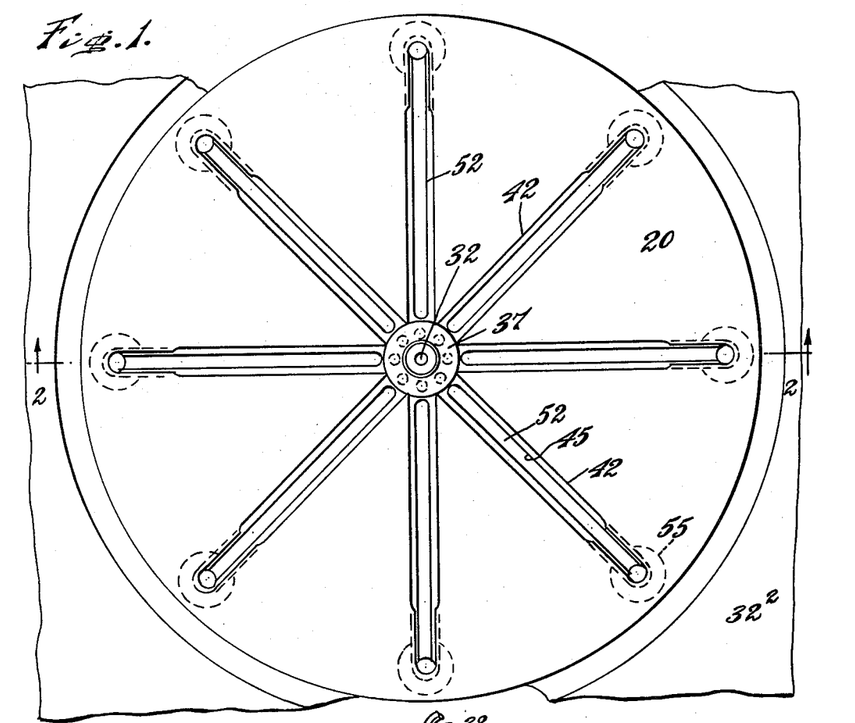
FIGURE 1 is a top plan view of the device of the invention with the cover removed and the housing partly broken away.
Figure 2:
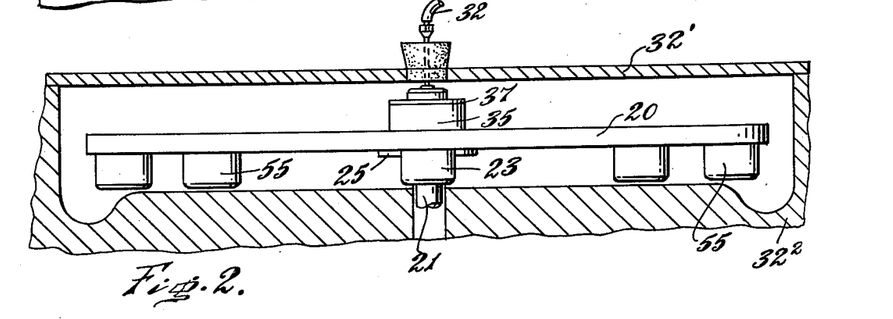
FIGURE 2 is an axial section of the device of FIGURE 1 on the line 2—2 with the housing and cover in place.

Above the stub shaft portion 26 the adapter has an extension 28 and a threaded end portion 30, the extension and the threaded end portion having a central opening 31 which receives development liquid such as solvent or buffer, suitably including mixture to be separated, conveniently from a suitable controllable feed device 32 which is not part of the present invention. The dropping device passes through a suitable opening in cover 32' which is mounted on housing 32². The central opening 31 communicates with a plurality of radially extending ports 33. Surrounding the extension 26 above the disc 20 and suitably having a key opening 34 to fit the extension 26 is a distributor cup 35 which has an interior tank 36 extending up above and surrounding the ports 33. The cup 35 is held in place by washer 37 and nut 37' threaded on threaded portion 30 by the adapter.

Figures 3, 8:
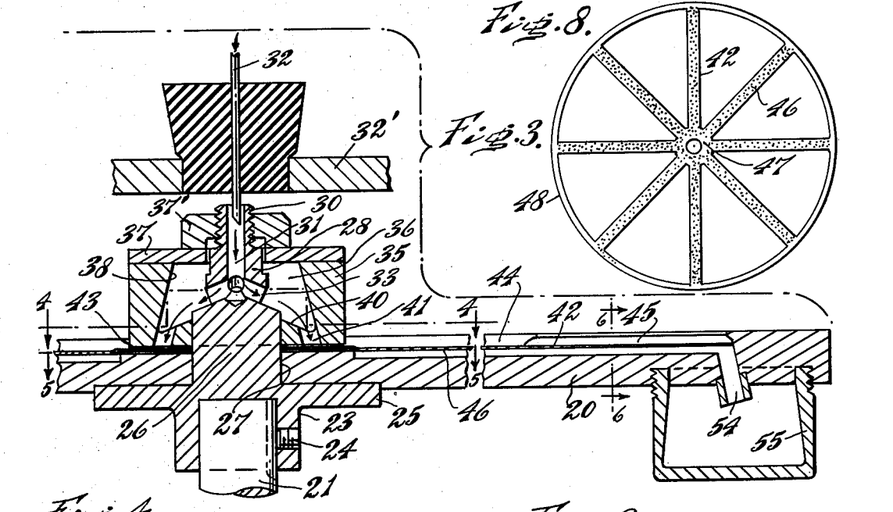
FIGURE 3 is an enlarged fragmentary axial section of the device of the invention through one of the channels which holds the medium.
FIGURE 8 is a diagrammatic top plan view showing the insertion of the paper or other medium in the form of a wheel which has an outer rim which will conveniently be removed.
Figure 4:
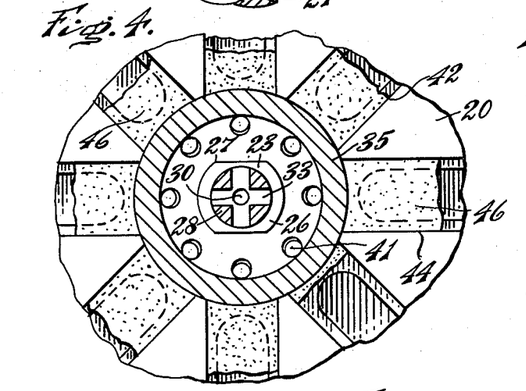
FIGURE 4 is a fragmentary horizontal section on the line 4—4 of FIGURE 3.

The cup has an upwardly converging interior annular wall 38 which under centrifugal force tends to carry any liquid in the cup to the bottom, and has a downwardly and outwardly sloping bottom wall 40 tending to feed liquid downwardly and outwardly and at the outer circumference has downwardly and outwardly extending ports 41 which are in the preferred embodiment aligned with the middle of the radial inner end of radially extending channels 42 in the disc 20.

In the preferred embodiment the radially extending channels at the inner end communicate with an annular recess 43 into which the cup 35 fits.

The upwardly converging form of the wall 38 of the cup and the downwardly diverging form of the ports 41 tends to overcome air binding, especially at lower speeds, which has been a serious difficulty in previous efforts to provide uniform feed of the development liquid.

Figures 5, 6, 7:
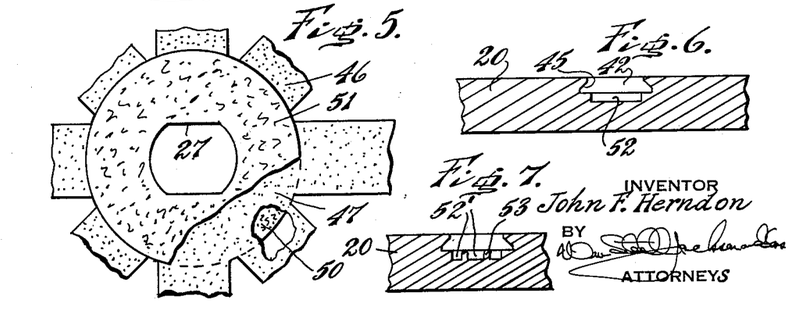
FIGURE 5 is a fragmentary horizontal section on the line 5—5 of FIGURE 3 omitting the metallic parts.
FIGURE 6 is an enlarged fragmentary section on the line 6—6 of FIGURE 3.
FIGURE 7 is a view similar to FIGURE 6 showing a variation.

Each of the radial grooves in the preferred form at its inner end is of rectangular formation as shown at 44, but at a radial outer portion it has upwardly converging side walls as shown at 45. The upwardly converging side walls 45 engage and hold in place radially extending strips 46 of separation medium, which may be a paper such as filter paper, or may be starch suitably impregnated on a base such as paper, or may be ion exchange resin suitably impregnated on a base such as paper, or may be deposits of starch or ion exchange resin in the radial groove.

It will be evident that the means of supporting the paper or other separation medium by the engagement with the walls is very convenient in avoiding difficulty through bulging of the paper strip under conditions of expansion when the paper becomes moistened at the inner end or over a portion of its length and tends to grow. The paper should be wide enough to just fill the groove 45.

At the inner end at the bottom of recess 43 is placed a hub 47 of separation medium such as paper, which in one embodiment of the invention (FIGURE 5) is integrally connected to the strips 46 as the hub of a wheel is connected to the spokes. For this purpose a wheel-like separation medium replacement unit may be used as shown in FIGURE 8 which has the hub 47, the spoke-like strips 46 and an outer rim 48 which will be conveniently removed after installation of the paper ribs. Thus the rim will serve to hold the components together when the wheel is applied to the disc. On both sides of the hub portion 47 of the separation medium I preferably place washers 50 and 51 (FIGURE 5) of a suitable fibrous dispersing medium, such as fiber glass fabric or felt, which tends to perform a wick action in allowing the separation liquid to distribute.

In find that the time of separation can be cut to about one-quarter in many cases by pre-wetting the fiber glass fabric or felt wicks with development liquid before starting the separation.

In the preferred embodiment the bottom of the channel 42 is cut away at the middle to form a radially extending recess 52 down the middle of the channel 42, which permits excess of development liquid to flow outwardly without forming pools and tending to interfere with the techniques of the separation of the components. If desired several different recesses 52' may be employed as shown in FIGURE 7 separated by supporting projections or ribs 53.

At the outer end each of the channels communicates by port 54 with a collecting cup 55 which preferably downwardly diverges as shown (FIGURE 3) to hold the liquid at a point remote from the channel and avoids a loss of material from the cup under centrifugal force.

Figure 9:
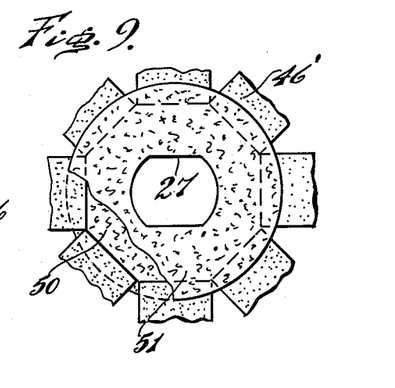
FIGURE 9 is a view similar to FIGURE 5 which shows a variation in which separate strips of medium are employed.

It will be evident that each of the channels if desired can have a wholly separate separating medium, and for example these may be different grades of paper, or one may be paper and another paper impregnated starch and others may be different grades of paper impregnated with ion exchange materials of different characters or different cellulose derivatives. This is shown in FIGURE 9, where it will be evident that a strip of separation medium 46' for each channel is carried into the radial inner end between the fiber glass washers 50 and 51 and this strip 46' may be separate from strips in other channels.

It is decidedly preferable to use separating media which are of consistent quality from the standpoint of chromatographic diffusion. In some cases paper having random fiber distribution may be employed. In other instances the fiber will have radial fiber distribution in the different channels and this may be accomplished by using separate paper strips for the different channels.

Figure 10:
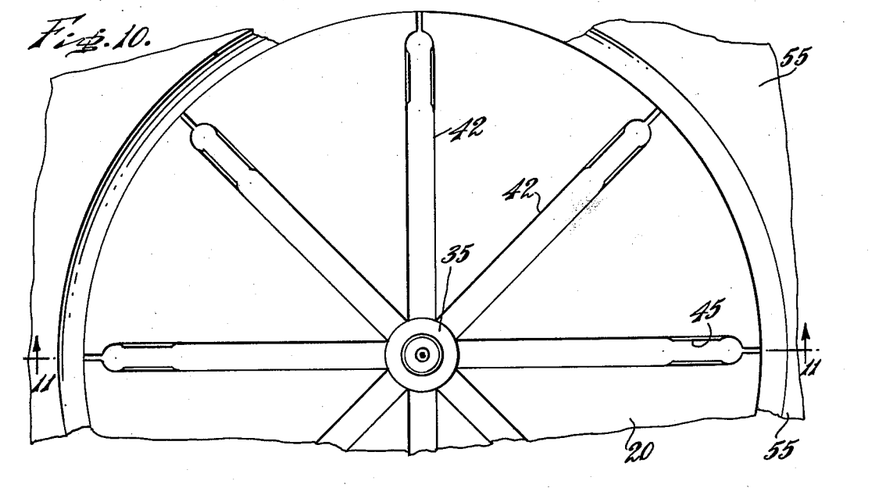
FIGURE 10 is a fragmentary top plan view of a modified form of chromatographic apparatus according to the invention which discharges into a collecting ring common to all channels.
Figure 11:
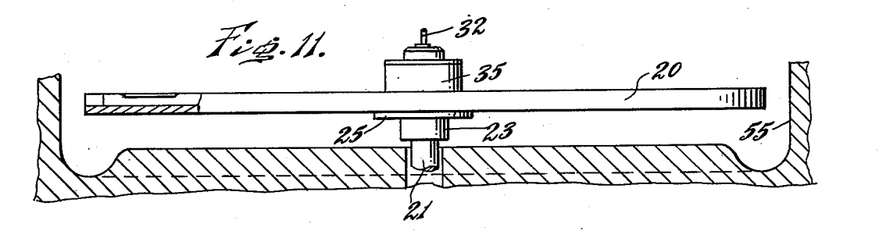
FIGURE 11 is a section on the line 11—11 of FIGURE 10.

In some instances the collector cups can be eliminated, and where all channels are discharging the same composition, a collector ring 55 may surround the outside of the disc as shown in FIGURES 10 and 11.

Figure 12:
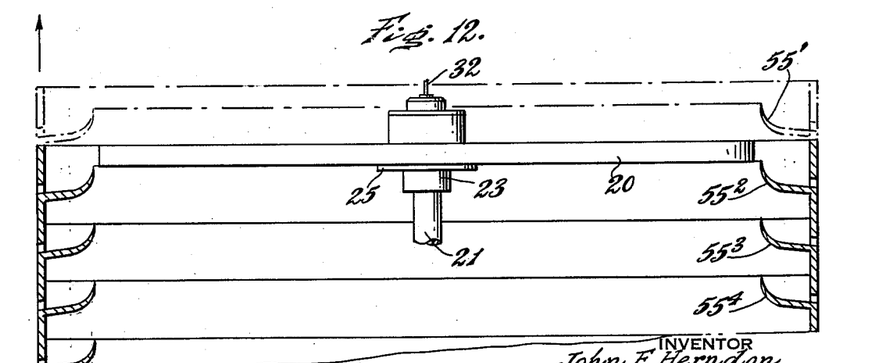
FIGURE 12 is a view similar to FIGURE 11 showing a series of collecting rings which are successively moved into place opposite the outer rim of the chromatographic apparatus as different fractions are being discharged.

In some instances the fractions will be of different compositions, and in FIGURE 12 I illustrate a succession of different collector rings $55'$, $55^2$, $55^3$, etc., which are progressively moved into position surrounding the channels of the disc as the operation proceeds.

It will be evident that the disc need not be flat but can be cone shaped, convex or concave, as desired.

Figures 13, 15:
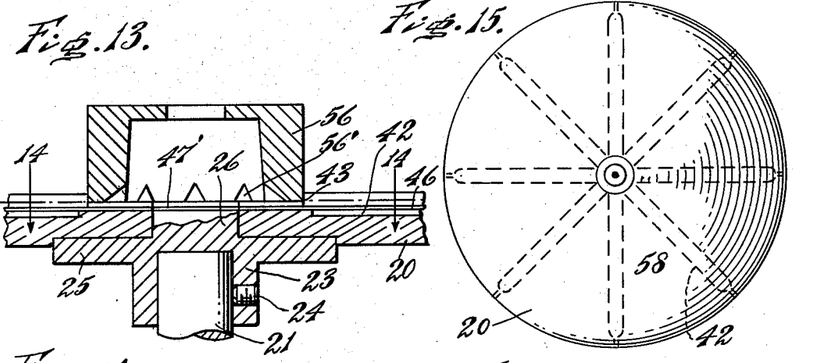
FIGURE 13 is a fragmentary axial section through a variant form of chromatographic apparatus according to the invention in which a star-like distributor is used at the hub.
FIGURE 15 is a top plan view of a variant form of chromatographic apparatus according to the invention using a "Chinese hat" type of cover.
Figures 14, 16, 17, 18, 19:
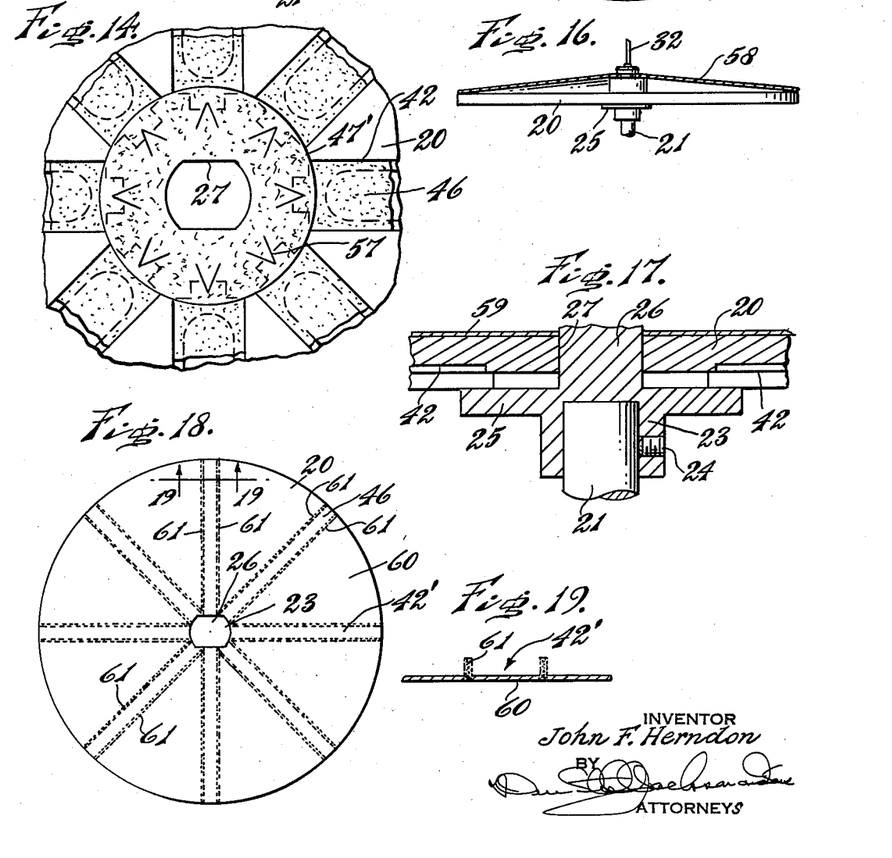
FIGURE 14 is a section on the line 14—14 of FIGURE 13 omitting the central adapter.
FIGURE 16 is an axial section of the device of FIGURE 15.
FIGURE 17 is a fragmentary axial section of a chromatographic apparatus according to the invention in which the rotor has been inverted to permit the use of a disc type of paper or other medium.
FIGURE 18 is a plan view of a modified form of chromatographic disc which has liquid directing ribs extending radially and impregnated into the paper or other medium to form channels.
FIGURE 19 is a section on the line 19—19 of FIGURE 18.

In some instances it is preferable to employ controllable wick feeding directly to the radial inner end at the center of each channel. In FIGURES 13 and 14 I illustrate such a device, in which a paper hub 47' of star-like configuration receives the development liquid from any suitable feeding device, here a cup 56 having feeding openings 56' extending radially in line with the channels, and by wick action deposits it at an apex 57 over the inner end of the paper strip 46 of each channel at the middle thereof. The apex suitably overlaps the inner end of the strip of separation medium.

It will be evident that various other contours for the feeding projections 57 rather than the star pointed form can be used to give various solvent characteristics as required and numerous forms have been tested, such as various curves.

With certain volatile solvents there is a considerable tendency to vaporize and condense and deposit droplets which may fall on the separation medium and confuse the results. With this purpose in view a suitably conical cover 58 is preferred which will cause any such droplets to flow to the outer edge without falling. This is best seen in FIGURES 15 and 16.

In some cases the user may prefer to use a disc of separating medium as in the prior art, and with this idea in view the disc can be inverted by removing the adapter and putting the adapter through the central opening from the opposite end, as shown in FIGURE 17, and placing a disc 59 of filter paper or other suitable separating medium on top of the flat surface, which gives support.

The principles of the invention can be readily embodied in a disc of separation media 60 such as paper, as shown in FIGURES 18 and 19, by separating it by means of a series of radially extending ribs 61 of phenolic resin or other material impregnated into the paper or other medium. The ribs 61 are impervious or substantially impervious to the developing liquid. The ribs 61 define the sides of the radial channels 42' as previously discussed. This can be applied using the reverse face of the metallic disc as in FIGURE 17.

Figure 20:
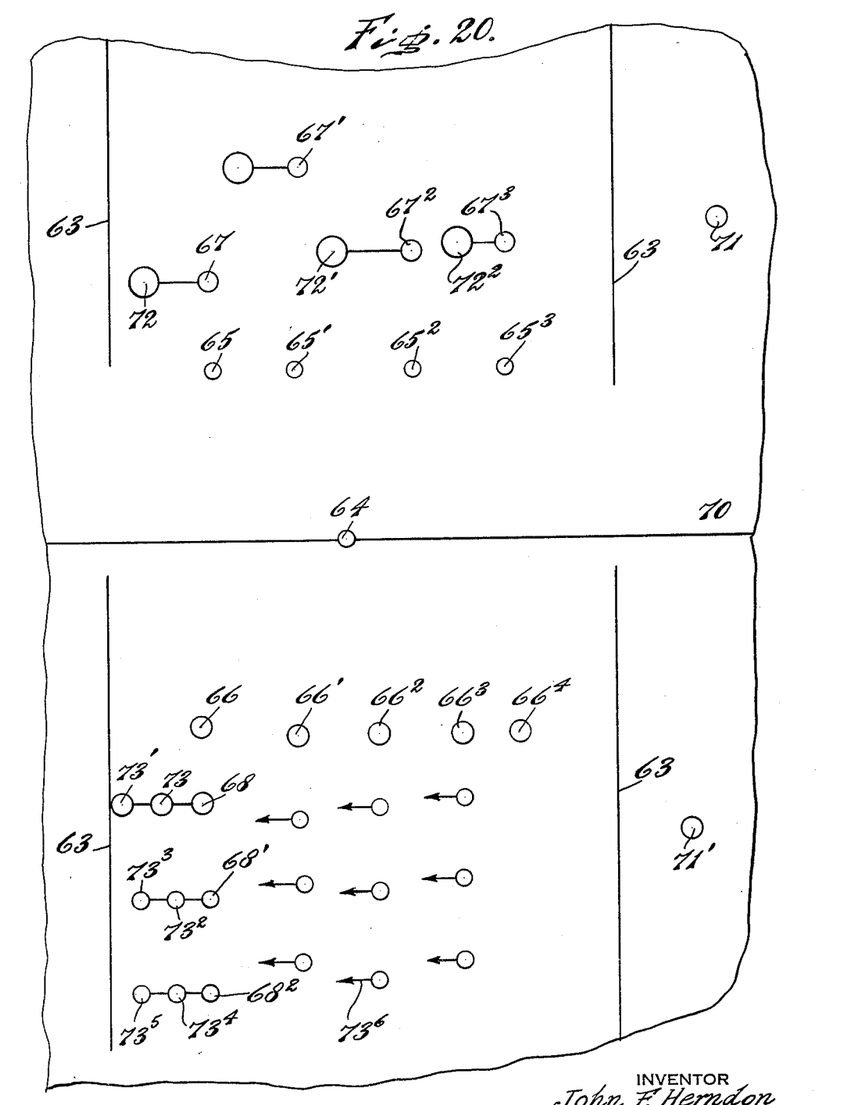
FIGURE 20 is a plan view showing multiple rotational center chromatography according to the invention.

The principles of the invention can be embodied in two-dimensional centrifugal chromatography as illustrated best in FIGURE 20. In this form the initial limits of radial channels on a paper disc are shown at 63 and the initial axis of rotation of the disc is at 64. Various specimens of known chemicals are spotted at 65, $65'$, $65^2$ and $65^3$ and various specimens of unknowns are spotted at 66, $66'$, $66^2$, $66^3$ and $66^4$, radially opposite.

The known compounds after treatment with the development liquid produce various characteristics $R_f$ areas 67, $67'$, $67^2$ and $67^3$ in a known time. The unknowns separate into various separate $R_f$ areas 68, $68'$ and $68^2$, etc., of which only the areas for one spot 66 are shown.

$R_f$ is equal to the movement of the specimen band divided by the movement of the advancing front of separation liquid.

The paper is then suitably separated along the line 70 and the portions are rotated around new axes 71 and 71', and preferably with a different development liquid, causing projection of a third dimensional migration to new $R_f$ areas 72, 72' and 72², etc. for the pure compounds, and the components 68, 68' and 68² separate into new components 73, 73', 73², 73³, 73⁴ and 73⁵. The other specimens do likewise as suggested by arrows 73⁶.

In some cases it is desirable to isolate one channel from another and permit the use not only of different separation media, but of different development liquids.

In FIGURES 21 to 24 I illustrate a series of individually separate channels 42', each of which may have the interior cross section as previously described, and suitably mounted on a desirably vertical shaft 21 by a hub 23' through engagement of hooks 23² in interlock openings 74 and clamping by bolt 75 extending through an opening 76.

Figure 21:
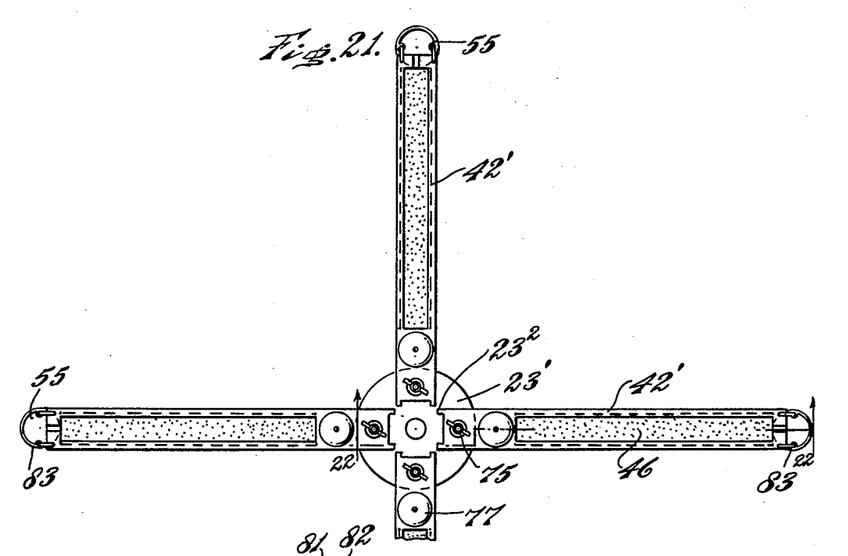
FIGURE 21 is a fragmentary plan view of a variant form of chromatographic apparatus according to the invention which has separate channels and separate feeds for each channel.
Figures 22, 23, 24:
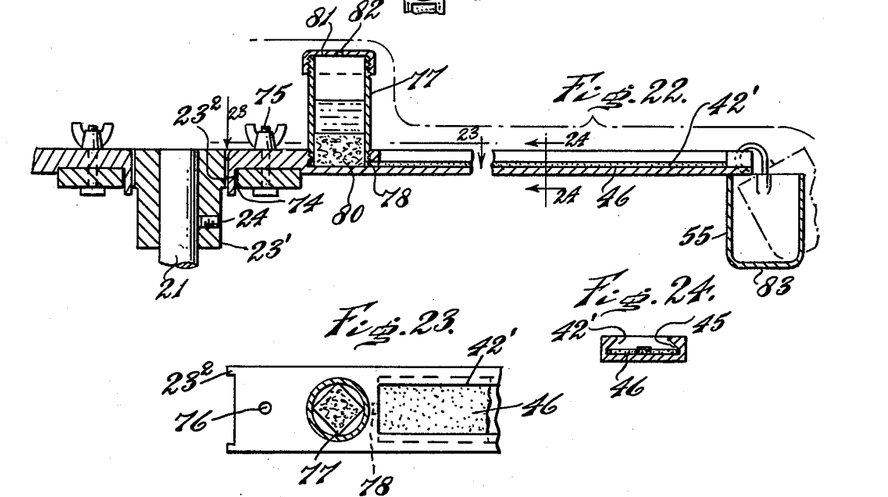
FIGURE 22 is an enlarged fragmentary section on the line 22—22 of FIGURE 21.
FIGURE 23 is a fragmentary plan section on the line 23—23 of FIGURE 22.
FIGURE 24 is a section on the line 24—24 of FIGURE 22.

The channel has near its radially inner end a reservoir 77 which has a radially outwardly extending discharge opening 78 which enters the channel 42' and distributes suitably at the center to the paper or other radially extending strip 46 engaged in the channel by the converging walls 45 previously described. The reservoir suitably has at the bottom a fiber glass or other filter 80 and is covered with a cover 81 having an air bleed opening 82.

The channel at the radial outer end has a suitable cup or other receiver 83 which is hinged and under centrifugal action can swing out to a radial outer position as in FIGURE 22.

It will be evident that in this case each of the channels can operate with a different solvent or other development liquid and with a different separation medium and of course with different materials being separated as desired. The material being separated in this case, as also in the cases previously described, can be introduced in solution in the development liquid or spotted on the paper or other medium as required.

OPERATION

In operation, in accordance with the present invention, the paper or other separation medium is placed in position on the rotor, and where spotting is to be used the known and unknown specimens are spotted directly opposite each other on the radial inner portions of the strips, using a micropipette or other suitable means to control the specimen size. The particular development liquid is then fed and the device rotated or in many cases a succession of different development liquids will be used. At suitable time intervals the operation will be stopped and the $R_f$ areas examined and integrated comparing knowns and unknowns.

Definitive results have been obtained in accordance with the present invention in times of the order of seven minutes with markedly distinct separation areas and clear front and back band lines.

Between each run using a different solvent or a different substance to be separated, all parts which contact the solvent and/or the material to be separated, including the solvent feed device, the grooved disc, and the solvent reservoir must be thoroughly cleaned to remove all of the previous residue, and then be rinsed with de-ionized water. The center fiber glass disc wicks 50 and 51 are changed after every three runs with the same solvent, and are changed whenever the solvent or the substance to be separated is changed. The separation medium, whether it be filter paper, ion exchange paper or cellulose medium, are cut beforehand to the proper width and length to fit in the groove. In the preferred embodiment where the paper has a preferential fiber direction, the paper is cut so that this preferential fiber direction is radial.

Care should be made in handling the medium, and rubber gloves should be worn which are free from any contaminating component during the cutting operation and during the setting up of the equipment.

*Example 1.—Procedure for separation of dye mixtures by high speed chromatography using one type of filter paper*

Five dyes are employed in this example:

Methyl Red
Methyl Orange
Brom Cresol Green
Brom Phenol Blue, and
Amido Black dissolved in water containing 0.2% of each dye by weight. The mixture of dyes as previously described are to be separated by Whatman No. 1 filter paper. Eight strips of filter paper numbered 1 through 8 are placed in 8 different grooves of the rotor, and 4 lambda of the dye mixture is applied in a band running from one edge to the other across the filter paper 1 centimeter from the inner end. The strips are then placed in the grooves of the rotor with the inner ends extending inwardly between the two center fiber glass disc wicks. The solvent reservoir housing is secured in place and the solvent, in this case $\frac{1}{10}$ mol of citric acid buffer having a pH of 3.5, is fed from the solvent feed device through the center reservoir housing at a rate of one drop every 25 seconds (0.13 ml./min.). The reservoir is turned at a speed of approximately 900 r.p.m. and the rotation is continued for 9 minutes. The disc is then quickly stopped by hand, and the strips of filter paper are removed and scanned in any suitable manner, as well known in the art, for example using the Spinco Analytrol-RB and a determination is made of the $R_f$ values for the various dyes.

It was found that in every case the bands were separated into different areas, the order from the radial inner end to the outside being amido black, methyl orange, methyl red, brom phenol blue and brom cresol green. These were compared with controls for the purpose of determining the identity and concentration.

*Example 2.—Procedure for separation of dye mixtures by high speed chromatography using four different filter papers*

Five dyes were mixed together in a water medium containing 0.2% by weight of each of the following:

Methyl Red
Methyl Orange
Brom Cresol Green
Brom Phenol Blue, and
Amido Black

The filter papers used were Whatman No. 1, Whatman No. 4, Whatman 3 mm. and Schleicher and Schuell #598. The differences are in the density of the filter papers as well known in the art.

Eight strips of filter paper were prepared and numbered, and had the following compositions:

No. 1 _______________ Whatman No. 1.
No. 2 _______________ Whatman No. 4.
No. 3 _______________ Whatman 3 mm.
No. 4 _______________ Schleicher and Schuell No. 598.
No. 5 _______________ Whatman No. 1.
No. 6 _______________ Whatman No. 4.
No. 7 _______________ Whatman 3 mm.
No. 8 _______________ Schleicher and Schuell No. 598.

Two lambda of dye mixture was applied in a band extending transversely across each strip about 1 centimeter from the radial inner end. Strips 1 through 4 received the mixture of the five dyes and 0.2% of methyl orange in water as a control was applied on strips 5 through 8. The strips were then placed in the radial grooves of the rotor with the inner ends of the strips between the two fiber glass disc wicks 50 and 51. The solvent reservoir was applied, and the solvent, in this case consisting of $KH_2PO_4$ buffer having a pH of 5.2, was fed from the solvent feeding device at a rate of approximately one drop every 30 seconds (0.125 ml./min.). The rotor was adjusted to a chosen speed in the range between 500 and 600 r.p.m. and was run at this speed for 12 minutes. The strips were then removed and scanned as above described.

Very effective separations were obtained on all of the different filter papers, and the $R_f$ values for the control were compared with those for the mixture of dyes. The best separation in this case was obtained by Whatman No. 1 filter paper.

Experiments similar to the above were carried out using other buffers at various pH's including sodium borate buffer, sodium citrate buffer and sodium phosphate buffer. A solvent consisting of 40 cubic centimeters of concentrated ammonium hydroxide and 10 cubic centimeters of n-propanol gave excellent results.

Figure 25:
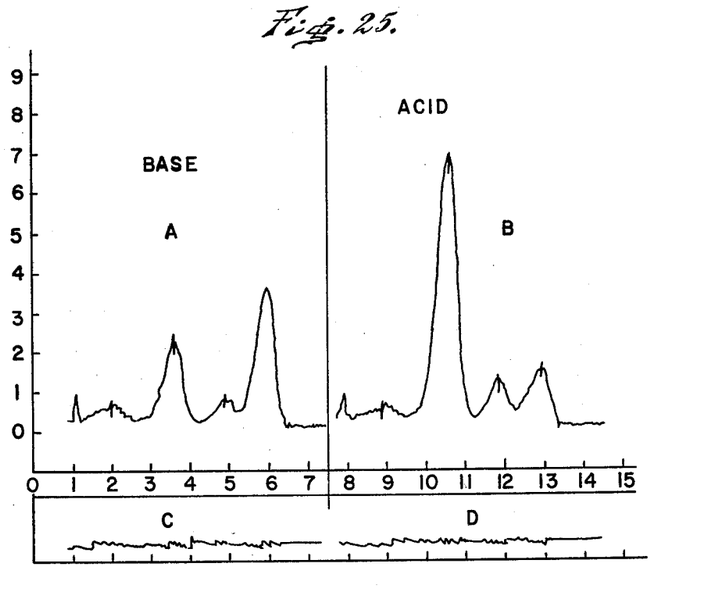
FIGURE 25 is a series of curves useful in evaluating the results of the device of the invention.

Other experiments similar to the above were carried out with Schleicher and Schuell filter paper 602, 2316 and 470. The ammonium hydroxide solvent gave scanning values as shown in FIGURE 25 for No. 1 filter paper specimen, which was scanned with the result shown at A for the density of each area when in a basic vapor and as shown at B when in an acid vapor. The upper curves plot density against position, and the lower curves C and D show the corresponding integrator values indicating the areas on the curve.

*Example 3.—Procedure for separation of dye mixtures without centrifugal forces*

Five dyes in a mixture as employed above and four filter papers as used in Example 2 were employed. The numbering of the strips was the same as in Example 2. The bands of dye mixture and of control were applied as in Example 2. The strips were placed in the machine in the manner previously described but the machine was not rotated. The solvent used was 40 cubic centimeters of concentrated ammonium hydroxide and 10 cubic centimeters of n-proponal, and the feed was at the rate of one drop every 30 seconds. After 60 minutes a fair separation of the dyes had taken place along the lengths of the strips, the solvent front having extended about ⅔ of the length of the strip at the end of 60 minutes. The strips were then removed and scanned as above described.

*Example 4.—Procedure for separation of amino acids by high speed chromatography*

Both acidic and basic amino acids are to be separated by high speed chromatography according to this example. The separation medium was weakly acidic ion exchange paper containing Amberlite IRC–50 resin, in the H plus form. Amberlite IRC–50 is a carboxylic acid cation exchange resin prepared by the copolymerization of methacrylic acid and divinylbenzene as set forth in U.S. Patent No. 2,340,111. Eight strips were numbered 1 through 8 and two lambda of the materials to be separated were spotted on the strips, 1 centimeter from the radial inner end. As an initial basis for determination of the $R_f$ of the various amino acids, they were applied to different strips as follows:

| | |
|---|---|
| No. 1 | Aspartic acid. |
| No. 2 | Arginine. |
| No. 3 | Glycine. |
| No. 4 | Lysine. |
| No. 5 | Serine. |
| No. 6 | Tyrosine. |
| No. 7 | Tryptophan. |
| No. 8 | Valine. |

Each amino acid was in a solution having a concentration of 0.02 mol in 0.1 N hydrochloric acid. The strips were placed in the grooves on the rotor with the inner ends extending between the two center fiber glass disc wicks. The solvent reservoir was placed on the machine, and a solvent in this case consisting of 0.1 M sodium acetate in water having a pH of 4.9, was fed at a rate of one drop every 45 seconds. The rotor was rotated at a speed of 700 r.p.m. for 20 minutes, then quickly stopped by hand, and the strips were dried in an oven at 90° centigrade, and then immersed in a 0.25% solution of ninhydrin in acetone. The color was allowed to develop in an oven at 100° centigrade for 20 minutes. The strips were scanned as above described and the $R_f$ determined.

Figure 26:
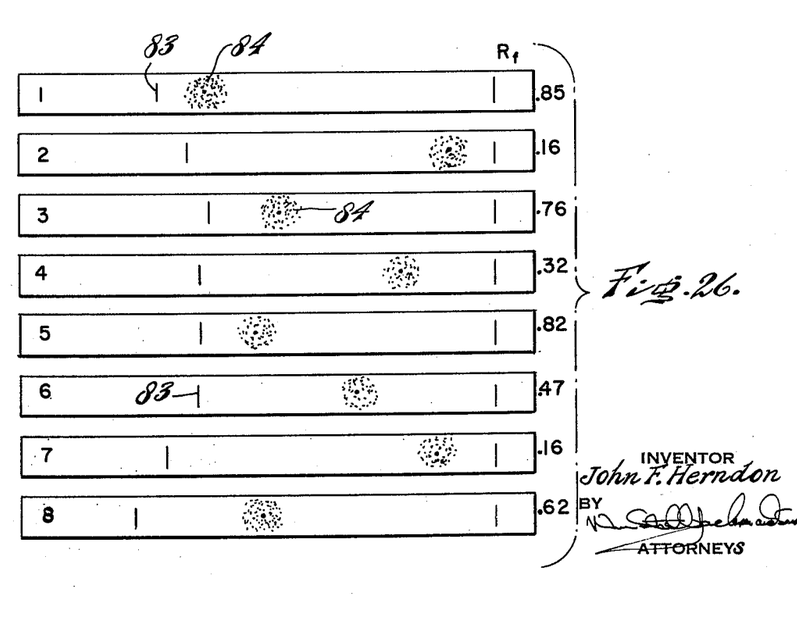
FIGURE 26 is a diagrammatic plan view showing a series of chromatographs obtained for amino acids according to the invention and illustrative of the character of results obtained.

FIGURE 26 shows the various strips numbered from 1 to 8, with the origins at the right and the solvent fronts 83 at the left. The locations of the various components are at 84. It will be evident that the distance of travel $R_f$ is different for the various components except in the case of arginine and tryptophan, and they can readily be separated by changing the pH of the buffer.

As an alternative procedure the spots 84 at the end of the operation can be eluted from the strips and read on a suitable spectrophotometer. When mixtures of amino acids are to be separated, they are spotted on strips which are placed in channels diametrically opposite from the controls.

Fair separation has been obtained using strong acid ion exchange paper such as Amberlite IR–120 in the Na plus form with a solvent consisting of 0.1 M sodium acetate buffer at a pH of 3.5. Amberlite IR–120 is a sulfonic acid type cation exchange resin prepared by the sulfonation of a copolymer of styrene and divinylbenzene, as set forth in U.S. Patent No. 2,336,007.

Good separations of amino acids have also been obtained with strongly basic ion exchange paper such as Amberlite IRA–400 resin in the chloride form of $KH_2PO_4$ buffer at pH 7.2. Amberlite IRA–400 is a strong base or quaternary anion exchange resin prepared by the amination of a chloromethylated styrene-divinylbenzene copolymer according to U.S. Patent No. 2,591,573.

Good separations of amino acids have also been obtained using Whatman 3 mm. filter paper with a solvent composed of 35 cubic centimeters of ethyl alcohol, 8 cubic centimeters of concentrated ammonium hydroxide, 5 cubic centimeters of methyl alcohol and 2 cubic centimeters of ligroine.

*Example 5.—Procedure for separation of dye mixture using starch gel*

Six dyes were admixed in water solution having 0.2% by weight of each of the following:

Methyl Red
Methyl Orange
Brom Cresol Green
Brom Phenol Blue
Brilliant Cresyl Blue, and
Amido Black A thick paste of corn starch in water was made up. Paper strips, suitably filter paper, were applied in the bottom of the radial grooves, and the corn starch paste was poured over the paper and was absorbed by the paper and allowed to form a layer about 2 mm. above the surface. This was heated to about 90° centigrade to remove air bubbles, and the result was a smooth homogeneous gel on the filter paper.

At a position 1 centimeter from the radial outer end of the fiber glass wick elements, 4 lambda of the dye mixture was applied to each groove. The distributing mechanism was applied at the center, and concentrated acetic acid was used as the solvent, and allowed to drop into the distributing reservoir at the rate of one drop every 30 seconds. The reservoir was turned at a speed of 200 r.p.m., and the operation was continued for 2 hours. An effective separation of the various dyes was obtained.

Good results have also been secured with the above technique running overnight without rotation, a heavy glass plate being placed directly on top of the grooved rotor to retard evaporation.

In view of my invention and disclosure, variations and modifications to meet individual whim or particular need will doubtless become evident to other skilled in the art, to obtain all or part of the benefits of my invention without copying the structure and process shown, and I, therefore, claim all such insofar as they fall within the reasonable spirit and scope of my claims.

Having thus described my invention what I claim as new and desire to secure by Letters Patent is:

1. In a device for liquid chromatography, rotating means having a substantially vertical axis of rotation and a plurality of substantially radially outwardly extending channels, said rotating means being statically balanced about the vertical axis, each said channel having parallel longitudinally extending side walls, a bottom for support of separating medium, and an open top which permits evaporation, an elongated strip of separating medium resting on the bottom of each said channel and extending across said channel, and each said strip engaging said walls of the channel and coextending with said channel, and means for supplying a developing liquid to the separating medium in each channel at radially inner portions of said strips for flow to occur radially outwardly along said strips and between said walls of said channels in response to rotation of said rotating means.

2. The device set forth in claim 1, wherein said walls of each channel converge upwardly in the channel and by said convergence hold said strip of separating medium in place in each channel.

3. The device set forth in claim 1, wherein said means for supplying the developing liquid comprises a vessel located adjacent said vertical axis, orifice means for feeding developing liquid from said vessel, and a fibrous distributor independent of said strips of separating medium mounted on said rotating means near said axis and extending outward to engage each strip near said inner end thereof, said distributor receiving developing liquid from said orifice means.

4. The device set forth in claim 1, further including a hub portion surrounding said vertical axis, and means on said hub portion communicating with the inner end of each channel for supplying developing liquid thereto, said means being centralized with respect to all of said channels.

5. The device set forth in claim 1, wherein said means for supplying developing liquid comprises separate means for supplying a different developing liquid to the separating medium in each channel.

6. A device of claim 1, wherein said inner ends of said strips of separating medium are interconnected by a hub from which said strips extend substantially radially, and wherein the outer ends of said strips are interconnected by a removable outer rim.

7. The device of claim 1, wherein the upper surface of the separating medium is exposed for evaporation including a cover placed in spaced relation above said separating medium, said cover having a sloping inner surface extending downwardly and outwardly from a point above the vertical axis of the rotating means to an outer edge of the said cover disposed beyond the outer edge of the separating medium, whereby condensation of the evaporated developing liquid accumulating on the inner surface of the cover will travel down the surface toward the outer edge of the cover thus preventing drippage of condensate onto the separating medium.

8. A component for a liquid centrifugal chromatographic device having a statically balanced rotor rotating on a vertical axis with a plurality of radially outwardly extending channels therein and an inlet adjacent to the center of the rotor for a supply of material in a liquid vehicle, said component including a hub portion adapted to be secured to the rotor of the device adjacent to the liquid vehicle supply inlet, a plurality of pervious separating medium strips extending radially outward from and integrally connected with said hub portion, each of said pervious strips being terminally spaced from one another and adapted to fit within the channels and to transmit the liquid vehicle radially outward while the rotor is being rotated.

9. The component of claim 8, wherein said component is a fibrous material, the fibers of the pervious radial strips being oriented substantially radially.

10. The component of claim 8, wherein the said component includes an outer rim portion interconnecting the outer ends of the pervious radial strips in circumferentially spaced apart relationship, said rim portion being readily detachable from the pervious radial strips.

11. A component for a liquid centrifugal chromatographic device having a statically balanced rotor rotating on a vertical axis and an inlet adjacent to the center of the rotor for a supply of material in a liquid vehicle, said component including a hub portion adapted to be secured to the rotor of the device adjacent to the liquid vehicle supply inlet, a plurality of pervious separating medium strips extending radially outward from and integrally connected with said hub portion, said pervious strips being interconnected with radial portions including radially extending ribs disposed in pairs, said pairs of ribs being substantially parallel to one another adjacent the sides of the pervious medium strips to form a channel therewith so as to transmit the liquid vehicle radially outward while the rotor is being rotated.

References Cited by the Examiner

UNITED STATES PATENTS

| 334,716 | 1/86 | Murphy | 210—246 |
| 2,986,280 | 5/61 | Magnuson | 210—31 X |
| 3,078,647 | 2/63 | Mosier | 55—197 |

FOREIGN PATENTS

| 585,224 | 2/47 | Great Britain. |
| 811,627 | 4/59 | Great Britain. |

OTHER REFERENCES

Caronna: La Chimica e L'Industria, volume 37, 1955, pp. 113–114.

E. Lederer: Chromatography, Elseview Publishing Co., New York, Second Edition, 1957.

REUBEN FRIEDMAN, *Primary Examiner.*

HERBERT L. MARTIN, *Examiner.*